Feb. 25, 1936.  T. V. BUCKWALTER  2,031,818
ROLLER BEARING AXLE
Filed Oct. 6, 1934
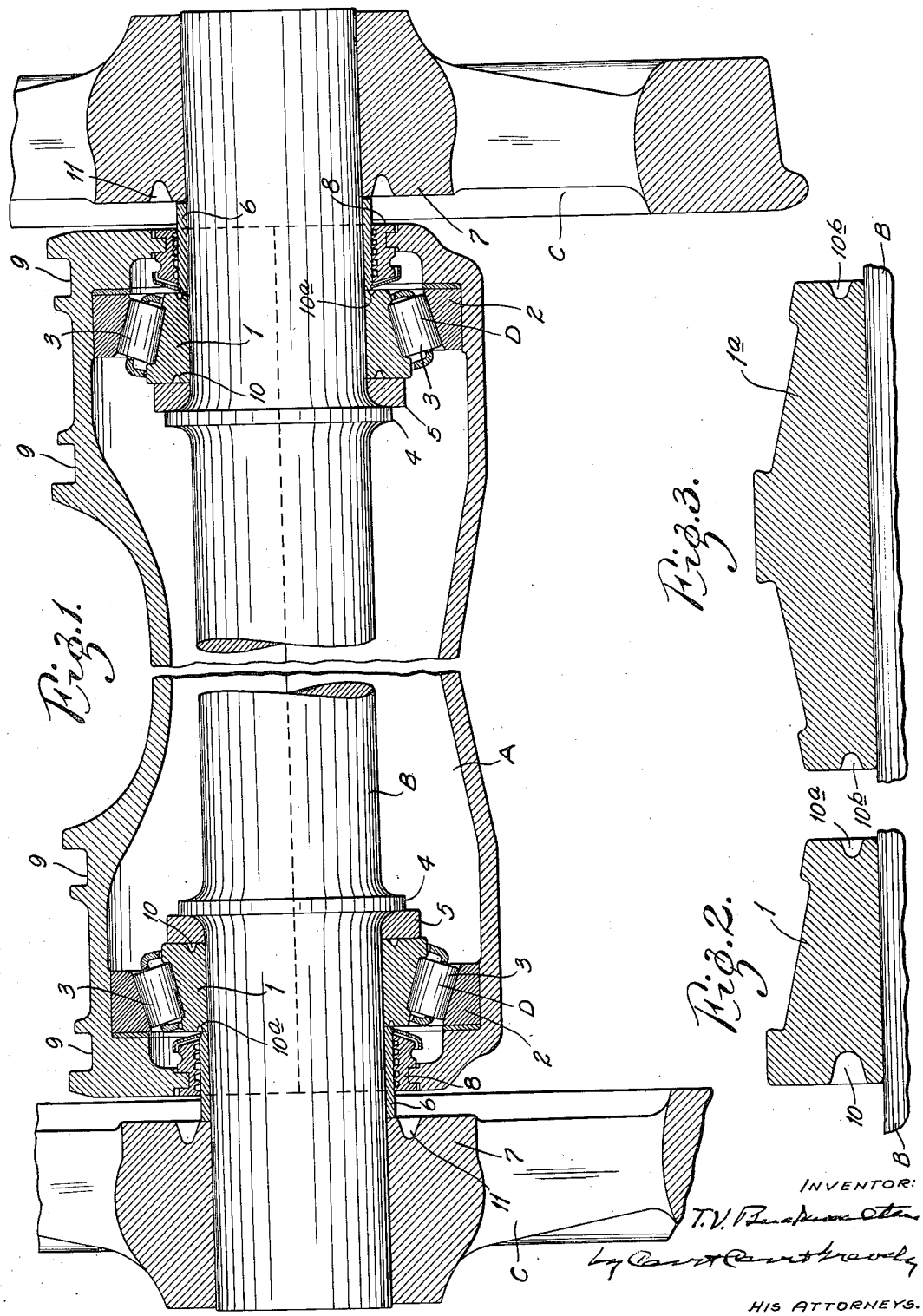

UNITED STATES PATENT OFFICE 2,031,818

ROLLER BEARING AXLE

Tracy V. Buckwalter, Canton, Ohio, assignor to The Timken Roller Bearing Company, Canton, Ohio, a corporation of Ohio Application October 6, 1934, Serial No. 747,182

8 Claims. (Cl. 287—52)

The invention relates to constructions of the kind wherein a member, such as a roller bearing inner raceway or a wheel, is shrunk on or secured with a heavy pressfit to a shaft, such as a railway car axle, that is subject to bending or deflection in service. Such a shaft is subject not only to stresses due to its action as a beam, but is also subject to circumferential compressive or hoop stresses occasioned by the pressure of the inner raceway member or wheel hub thereon throughout its circumference. With a shaft subject to such stresses, there is a concentration or abrupt change of stress in the shaft at the ends of the raceway member and wheel hub with a consequent liability of fracture there. The principal object of the present invention is to avoid such concentration or abrupt changes of stresses in the shaft and develop the full strength thereof. The invention consists principally in providing the ends of the inner raceway member and/or the wheel hub with an annular groove that is shaped so as to gradually reduce the tightness of the circumferential grip of the end portions of said members on the shaft. The invention also consists in the construction, combination and arrangements of parts hereinafter described and claimed.

In the accompanying drawing, which forms part of this specification and wherein like symbols refer to like parts wherever they occur, Fig. 1 is a vertical longitudinal section through the end portion of a roller bearing railway car axle construction conforming to my invention;

Fig. 2 is an enlarged detailed view, showing the shape of the end grooves in the raceway member of the roller bearing; and Fig. 3 is a view similar to Fig. 2, showing a double raceway member provided with stress relief in its ends.

Referring to the accompanying drawing, my invention is illustrated in connection with a roller bearing car axle construction of the inboard type; but it is also applicable to constructions of the outboard type and to other roller bearing axle or shaft constructions. The construction shown in Fig. 1 of the drawing comprises a horizontally split housing A, a load carrying shaft or axle B extending beyond the end of said housing and having a wheel C shrunk on or secured thereto with a heavy pressfit, and a roller bearing D interposed between said housing and said axle for transmitting the load to the latter. Said roller bearing comprises a cone or inner raceway member 1 shrunk on or secured with a heavy pressfit to the axle B, a cup or outer raceway member 2 mounted in the end of the axle housing A, and conical bearing rollers 3 interposed between said cone and said cup. A suitable spacer ring 5 is mounted on the axle B between the inner end of the inner raceway member 1 and a thrust rib 4 on said axle, a spacing sleeve 6 is mounted on said axle B between said inner raceway member and the hub 7 of the wheel C, and the end of the axle housing A is closed by means of an integral end flange 8 that closely encircles said spacing sleeve. The load is transmitted to the housing by equalizing bars (not shown), which rest upon seats 9 provided therefor in the top of the axle housing A above the roller bearing D.

The construction thus far described is well known. In such a construction, the tight fit of the raceway member 1 and wheel hub 7 on the axle causes an abrupt change of beam stress and hoop stress in the portions of the axle in the planes of the ends of the inner raceway member 1 and the inner end of the wheel hub 7; and it is at these points that fractures are most likely to occur.

In order to prevent such fractures of the axle, it is desirable to secure a wider distribution of the stresses which bring about such fractures. According to the present invention, such distribution of the axle stresses at the ends of the inner raceway member and at the inner ends of the wheel hub 7 is accomplished by providing each end of said raceway member 1 and the inner end of said wheel hub with an annular groove. By reason of the different diameters of the opposite ends of the conical inner raceway member 1 and the inner end of the wheel hub 7, the groove 10 in the large end of said member may be made deeper and wider than the groove 10a in the small end thereof and the groove 11 in the inner end of said wheel hub may be made deeper and wider than the raceway member grooves. Fig. 3 illustrates a duplex cone or inner bearing member 1a having ends of the same diameter and provided with stress relief grooves 10b of the same width and depth.

Stress relief may be obtained by means of grooves of various size and shape; but experiments indicate that the greatest relief is obtained with a relatively deep V-shaped groove located relatively close to the axle and having its inner face disposed at an angle of about twenty degrees (20°) thereto. In the present construction, concentration of the beam and hoop stresses in the axle at the ends of the inner bearing member and at the inner end of the wheel hub member is prevented by the V-shaped relief grooves which form a thickness of metal between the axle and said members of gradually decreasing thickness from the bottom of the groove to the end of the member, whereby such stresses drop off gradually from a maximum at the plane of the bottoms of the grooves to a minimum at the ends of said members and thus prevent fractures at these points.

While the invention is described as applicable to a roller bearing axle, it is obvious that it is equally applicable to other constructions wherein a member is shrunk or pressed on a shaft.

What I claim is:

1. The combination with a shaft of a member having a tight fit thereon, said member having an annular groove in an end portion thereof adapted to reduce the tightness of the fit of said portion on said shaft.

2. The combination with a shaft of a member having a tight fit thereon, said member having an annular groove in an end thereof adapted to reduce the tightness of the fit of said end on said shaft, the wall of the groove located nearest said shaft being inclined from the bottom of the groove in the direction of said shaft.

3. The combination with a shaft of a member having a tight fit thereon, said member having an annular groove in an end thereof adapted to reduce the tightness of the fit of said end on said shaft, said groove being shaped to provide a greater amount of metal between the shaft and the groove at the bottom of the groove than at said end of said member.

4. The combination with a shaft of a member having a tight fit thereon, said member having an annular groove in an end thereof adapted to reduce the tightness of the fit on said end on said shaft, said groove being of substantially V-shaped section.

5. The combination with a shaft of a roller bearing inner raceway member having a heavy pressfit, said member having annular grooves formed in its end faces close enough to the bore thereof to permit the end portions of said raceway member to yield circumferentially and thereby reduce the hoop stresses in said shaft at the ends of said raceway member.

6. The combination of a shaft of a wheel having a hub mounted on said shaft with a heavy pressfit, said wheel hub being provided at one end thereof with an annular groove located close enough to the bore thereof to permit the end portion of said wheel hub to yield circumferentially and thereby reduce the hoop stresses in said shaft at said end of said wheel hub.

7. A roller bearing raceway member comprising a body member having an axial bore and an annular groove in at least one end of said body member of such proportion as to reduce the tightness of fit of the end portion of the bearing member when pressed on a mounting piece.

8. A car wheel having a hub portion provided with an axial axle receiving bore and an annular groove in at least one end of said hub portion of such proportion as to reduce the tightness of fit of the end portion of said hub portion when pressed on an axle.

TRACY V. BUCKWALTER.